United States Patent
Guo et al.

(10) Patent No.: US 9,425,851 B2
(45) Date of Patent: Aug. 23, 2016

(54) METHOD FOR CONTROLLING PERFORMANCE IN A RADIO BASE STATION ARRANGED FOR COMMUNICATION IN TDD MODE, AND RADIO BASE STATION

(75) Inventors: Zhiheng Guo, Beijing (CN); Qingyu Miao, Beijing (CN); Youping Su, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/350,223

(22) PCT Filed: Nov. 10, 2011

(86) PCT No.: PCT/CN2011/082038
§ 371 (c)(1),
(2), (4) Date: Apr. 7, 2014

(87) PCT Pub. No.: WO2013/067699
PCT Pub. Date: May 16, 2013

(65) Prior Publication Data
US 2014/0247745 A1    Sep. 4, 2014

(51) Int. Cl.
*H04B 1/44*    (2006.01)
*H04W 24/08*    (2009.01)
*H04B 1/525*    (2015.01)

(52) U.S. Cl.
CPC .................. *H04B 1/44* (2013.01); *H04B 1/525* (2013.01); *H04W 24/08* (2013.01)

(58) Field of Classification Search
CPC ....... H04B 1/525; H04B 17/104; H04B 17/18
See application file for complete search history.

(56) References Cited

U.S. PATENT DOCUMENTS

| 6,356,536 B1 * | 3/2002 | Repke ................. H04B 1/525 370/282 |
| 2002/0183086 A1 * | 12/2002 | Hellmark et al. ............. 455/522 |
| 2004/0203548 A1 | 10/2004 | Kim |

(Continued)

FOREIGN PATENT DOCUMENTS

| CN | 1312986 A | 9/2001 |
| CN | 1531216 | 9/2004 |
| CN | 101420236 | 4/2009 |

OTHER PUBLICATIONS

PCT International Preliminary Report on Patentability for PCT Counterpart Application No. PCT/CN2011/082038, (May 13, 2014), 7 pages.

(Continued)

*Primary Examiner* — Redentor Pasia
*Assistant Examiner* — Peter Mak
(74) *Attorney, Agent, or Firm* — NDWE LLP

(57) ABSTRACT

The present invention relates to a method for controlling performance in a radio base station communicating in a Time Division Duplex (TDD) mode in a cellular network. The radio base station has a transceiver comprising a transmitter part, a receiver part, and an antenna, the antenna being alternately connectable to the transmitter part and the receiver part. The method comprises: estimating, at the receiver part, a leakage signal in the receiver part, the leakage signal originating from a local oscillator of the transmitter part; and removing, at the receiver part, the estimated leakage signal from a received uplink signal. The present invention also relates to a corresponding radio base station.

20 Claims, 7 Drawing Sheets

(56) References Cited

U.S. PATENT DOCUMENTS

| | | | |
|---|---|---|---|
| 2004/0223449 A1* | 11/2004 | Tsuie et al. | 370/204 |
| 2005/0107051 A1 | 5/2005 | Aparin et al. | |
| 2005/0111525 A1* | 5/2005 | Driesen et al. | 375/147 |
| 2006/0068716 A1* | 3/2006 | Kim | H04B 1/525 455/67.11 |
| 2007/0009011 A1 | 1/2007 | Coulson | |
| 2008/0242245 A1* | 10/2008 | Aparin | 455/126 |
| 2009/0002211 A1* | 1/2009 | Breems et al. | 341/143 |
| 2011/0317647 A1* | 12/2011 | Cho et al. | 370/329 |

OTHER PUBLICATIONS

PCT Notification of Transmittal of the International Search Report and the Written Opinion of the International Searching Authority of PCT Counterpart Application No. PCT/CN2011/082038, (Aug. 23, 2012), 11 pages.

"Physical Channels and Modulation", *3GPP TS 36.211 V10.3.0, Technical Specification, 3rd Generation Partnership Project; Technical Specification Group Radio Access Network; Evolved Universal Terrestrial Radio Access (E-UTRA)* (Release 10), (Sep. 2011), 103 pages.

"Physical channels and modulation", *3GPP TS 36.211 V12.0.0; 3rd Generation Partnership Project; Technical Specification Group Radio Access Network; Evolved Universal Terrestrial Radio Access (E-UTRA)*; (Release 12), (Dec. 2013), 120 pages.

First Office Action, CN Application No. 201180074798.9, dated Aug. 24, 2015, 12 pages.

Second Office Action, CN Application No. 201180074798.9, dated Feb. 3, 2016, 19 pages.

Extended European Search Report, EP Application No. 11875305.2, dated Apr. 13, 2015, 9 pages.

\* cited by examiner

METHOD FOR CONTROLLING PERFORMANCE IN A RADIO BASE STATION ARRANGED FOR COMMUNICATION IN TDD MODE, AND RADIO BASE STATION

CROSS-REFERENCE TO RELATED APPLICATIONS

This application is a National stage of International Application No. PCT/CN2011/082038, filed Nov. 10, 2011, which is hereby incorporated by reference.

TECHNICAL FIELD

The present disclosure relates generally to a method for controlling performance in a radio base station arranged for communication in a Time Division Duplex (TDD) mode. The disclosure also relates to a radio base station arranged for communication in TDD mode.

BACKGROUND

Cellular technologies specified by the $3^{rd}$ Generation Partnership Program (3GPP) are the most widely deployed in the world. A new step being studied and developed in 3GPP is an evolution of 3G into an evolved radio access technology referred to as Long-Term Evolution (LTE). In LTE, different modes of communication can be used for radio nodes in a cellular network, such as Frequency Division Duplex (FDD), Time Division Duplex (TDD) and half duplex.

In TDD, a single physical channel can be utilized for both uplink and downlink transmissions. The uplink and downlink transmissions are separated in time, in communication between a radio base station and a mobile terminal. I.e. they take place in different, non-overlapping time slots. Therefore, the participating radio nodes are required to switch between transmit mode and receive mode according to a predefined radio frame scheme, thus avoiding that uplink and downlink transmissions occur on that physical channel simultaneously. An example of such a scheme is illustrated in FIG. 1. In this example, a radio frame 100 of 10 ms duration comprises ten sub-frames 0-9 of 1 ms duration each, which can be used for either uplink or downlink transmissions on the same physical channel in a communication.

In FIG. 1, an uplink transmission in dub-frame 5, as indicated by an upwardly directed arrow, is followed by a downlink transmission in sub-frame 6, as indicated by a downwardly directed arrow. A single sub-frame 1 is even divided into a field 102 for a downlink Pilot Time Slot, DwPTS, and a field 104 for an uplink Pilot Time Slot, UpPTS, the fields 102 and 104 being separated by a field 106 denoted Guard Period, GP allowing for the above switch and transition of communication modes. FIG. 1 thus illustrates that both nodes involved in the communication must switch between transmit mode and receive mode in an accurate and synchronized manner to avoid collisions and disturbances on the physical channel used, particularly between uplink and downlink transmissions.

In FIG. 2, a transceiver 200 arranged for communication in TDD mode is shown in a simplified version. The transceiver 200 comprises a transmitter part 210 and a receiver part 220. The transmitter part 210 is of a direct-conversion type, which is widely used for radio base stations (RBSs) in LTE. The transmitter part 210 comprises a transmitter local oscillator (TX LO) 212 connected to a mixer 214. The receiver part 220 comprises a receiver local oscillator (RX LO) 222 connected to a mixer 224. The transceiver further comprises a mode switch 230 and an antenna 240. The mode switch 230 is used to either connect the transmitter part 210 or the receiver part 220 to the antenna 240. Thereby, the same physical link may be used for either uplink or downlink communication. By uplink communication is meant transmission from a mobile terminal to an RBS. At uplink communication the mode switch 230 is set such that the receiver part 220 of the transceiver 200 of the RBS is connected to the antenna. By downlink communication is meant transmission from an RBS to a mobile terminal. At downlink communication the mode switch 230 is set such that the transmitter part 210 of the transceiver 200 is connected to the antenna. The above described transmitter part 210 is called a direct-conversion transmitter since no intermediate frequency (IF) stage is used, i.e. no up-conversion stage and IF filters have to be used. Instead, the baseband signal is directly modulated onto the radio frequency (RF) carrier.

Accordingly, an input signal to be transmitted is fed to the input of the transmitter 210 and mixed in the mixer 214 with a local oscillator signal fed from the TX LO 212. Further, if the transceiver is in transmission mode, i.e. if the mode switch 230 has connected the transmitter part 210 to the antenna 240, the modulated signal can be transmitted on the downlink to mobile terminals via the antenna 240. When the transceiver is in reception mode, the mode switch has connected the receiver part 220 to the antenna 240, and an uplink signal can be received at the receiver part 220. Further, the received uplink (UL) radio signal can be down-converted in the mixer 224 by being mixed with a corresponding RX LO signal. Thereby, the carrier wave is subtracted and the base band signal remains. The RX LO signal may be generated by a separate RX LO or by the TX LO.

Such transceivers may experience disturbances, especially for signals received on the uplink. Consequently, there is a need to decrease disturbances at uplink communication for transceivers operating in TDD mode.

SUMMARY

It is an object of the invention to decrease disturbances at uplink communication for transceivers in radio base stations operating in TDD mode. It is possible to achieve this object by using a method and a radio base station as defined in the attached independent claims.

To address the above mentioned problem, the inventors have realized that at least some of the uplink disturbances in the receiver part of a radio base station operating in TDD mode originate from the transmitter local oscillator signal leaking into the receiver part of the transceiver. Starting from this realization, the inventors have come up to with the solutions described below.

According to one aspect, a method is provided for controlling performance in a radio base station communicating in a Time Division Duplex, TDD, mode in a cellular network. The radio base station has a transceiver comprising a transmitter part, a receiver part, and an antenna, the antenna being alternately connectable to the transmitter part and the receiver part. The method comprises: estimating, at the receiver part, a leakage signal in the receiver part, the leakage signal originating from a local oscillator of the transmitter part; and removing, at the receiver part, the estimated leakage signal from a received uplink signal. The leakage signal is removed when the antenna is connected to the receiver part, such that the received uplink signal is fed into the receiver part. "A received uplink signal" is a signal received at the antenna that is fed into the receiver part. The received uplink signal comprises the leakage signal from the TX LO. The received uplink signal also comprises signals from mobile terminals transmitting on the uplink and noise. By such a method, the received uplink signal is compensated for any leakage from the local oscillator of the transmitter part, such that the impact of the leakage signal to the received uplink signal is greatly reduced. Eventually, after compensation, a signal with low disturbance is achieved at the receiver. Another advantage is that for such a solution, no extra hardware is necessary for reducing interference to the received uplink signal due to TX LO leakage. Instead, the solution can be realized using only software.

According to another aspect, a radio base station for communication in a Time Division Duplex, TDD, mode in a cellular network, is provided. The radio base station has a transceiver comprising a transmitter part, a receiver part, and an antenna, wherein the antenna is alternately connectable to the transmitter part and the receiver part. The radio base station further comprises: an estimating unit for estimating at the receiver part, a leakage signal in the receiver part, wherein the leakage signal originates from a local oscillator of the transmitter part; and a removing unit for removing at the receiver part the estimated leakage signal from a received uplink signal.

The removing unit and the estimating unit are preferably positioned at the base band side of the receiver.

The method of the invention may be performed by software. Consequently, according to a third aspect, a computer program product is provided, comprising computer readable code means, which when run in a radio base station as described in the herein described embodiments, causes the radio base station to perform the corresponding method as herein described.

The above method and radio base station may be configured and implemented according to different optional embodiments, which will be shown in the following detailed description, wherein further possible features and benefits will become apparent.

BRIEF DESCRIPTION OF DRAWINGS

The solution will now be described in more detail by means of exemplary embodiments and with reference to the accompanying drawings, in which.

DETAILED DESCRIPTION

Figure 1:
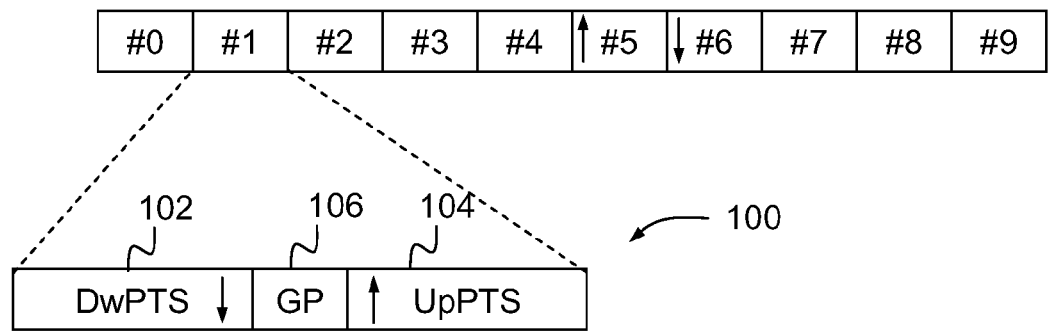
FIG. 1 is a diagram illustrating a typical radio frame scheme, according to the prior art.

Briefly described, a solution is provided that decreases the disturbances on uplink signals received at a receiver in a radio base station operating in TDD mode. The solution is based on the realization that at least some of the disturbances in the received uplink signal in the receiver part originates from the local oscillator of the transmitter part, TX LO, due to leakage of the local oscillator signal into the receiver part.

Starting from this realization, the natural way of solving such a problem would be to try to decrease the leakage originating from the transmitter part. This may be achieved by shutting off the TX LO at uplink receiving intervals. Thereby there will be no leakage at uplink intervals. However, the TX LO has very narrow bandwidth in order to get good phase noise. Therefore, it will take a long time for the TX LO to change from an unlocked state to a locked state, which means that it is not possible to shut off the TX LO at uplink receiving intervals. Instead, the TX LO needs to be switched on during uplink intervals as well as downlink intervals.

Another way of decreasing the leakage from the transmitter part may be to isolate the transmitter from the receiver such that the leakage signals from the transmitter are low. However, to get an acceptable isolation has proven to set quite high requirements from a hardware point of view. Also, there are several different ways that a leakage signal from the transmitter local oscillator may be spread to the receiver part: It may be spread via radiation, being conducted to the receiver part via ground or via power connections. To sum up, it is quite complicated to prevent the TX LO signal from a direct-conversion transmitter to leak into the receiver part of a transceiver working in TDD mode such that the leakage signal has an acceptably low level. This is especially true for a multi lobe radio base station, such as an 8 lobe radio base station.

Instead of decreasing the leakage originating from the transmitter part, the solution is based on solving the problem at the receiver part. According to the invention, this is achieved by estimating the leakage signal in the receiver part, which leakage signal originates from the transmitter local oscillator, TX LO. Thereafter, the estimated leakage signal is removed from uplink signals received at the receiver. Thereby, the leakage signal originating from the TX LO at the transmitter part is compensated for at the receiver part, which results in that the impact of TX LO leakage on the received uplink signals is greatly reduced.

Consequently, according to an embodiment, the TX LO leakage signal is measured in the base band at an uplink receiving interval, preferably by measuring signal strength on an uplink signal, and calculating the leakage signal based on the measurements, in either time domain or in frequency domain. Thereafter, the calculated leakage signal is removed from an uplink signal at the receiver part, in either the time domain or in the frequency domain. To measure and estimate in the base band instead of in the radio frequency band is simpler due to lower sampling rate needed. Also, any calculations may be made in the digital domain if performed in the base frequency band. "Base band" or "base frequency band" is defined as a low-frequency band of the received signal. Alternatively, the base band is defined as a received RF signal for which the carrier wave radio frequency has been subtracted.

Figure 3:
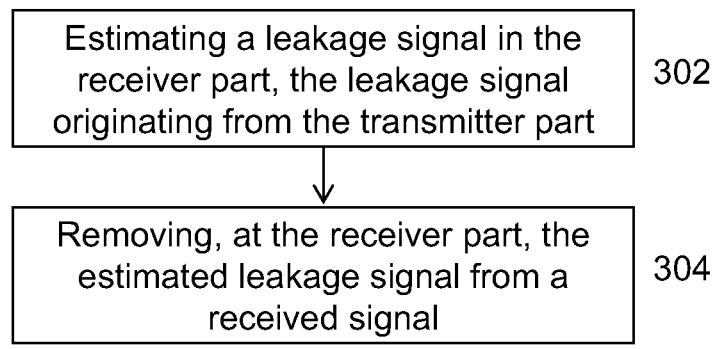
FIGS. 3-5 are flow charts illustrating different methods in a radio base station, according to possible embodiments.

According to an embodiment, a method for controlling performance in a radio base station communicating in a Time Division Duplex, TDD, mode in a cellular network is described in FIG. 3. The method will be described in relation to the transceiver described in FIG. 6. The method deals with a radio base station that has a transceiver comprising a transmitter part 210, a receiver part 220, and an antenna 240, the antenna being alternately connectable to the transmitter part and the receiver part. The method according to the embodiment comprises: estimating 302 a leakage signal in the receiver part, the leakage signal originating from the transmitter part. Especially, the leakage signal originates from a local oscillator 212 of the transmitter part. The method further comprises the step of removing 304, at the receiver part, the estimated leakage signal from a received uplink signal.

Thereby, the leakage signal originating from the transmitter part is compensated for at the receiver part, which results in that the impact of leakage from the transmitter on the received uplink signal is greatly reduced.

According to another embodiment of the method for controlling performance in a radio base station, the step of estimating 302 the leakage signal is performed by measuring signal strength in the receiver part for the received uplink signal. According to another embodiment, the step of estimating 302 is performed when the antenna is connected to the receiver part, such that the uplink signal can be received at the receiver part.

Figure 4:
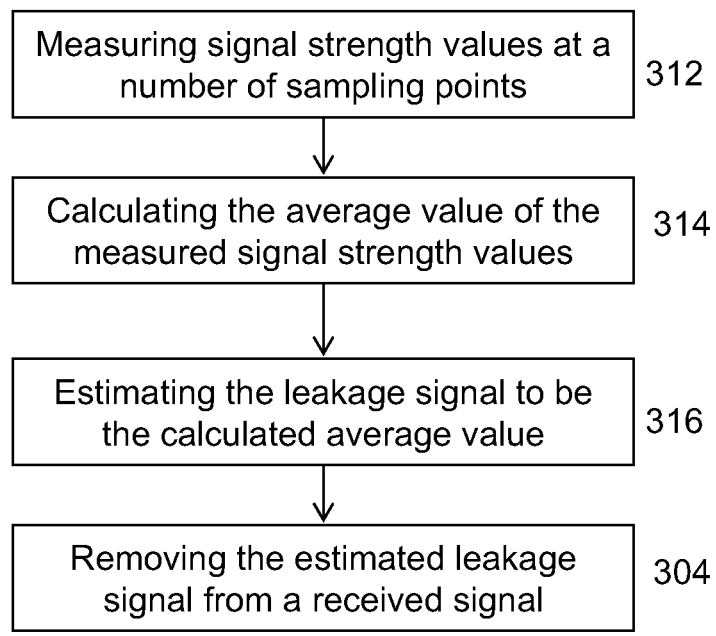

In FIG. 4, an exemplary method is described for controlling performance in a radio base station communicating in TDD mode, wherein the step of estimating is performed on signals in the time domain. This method comprises: measuring 312 signal strength values of the received uplink signal at a number of sampling points; calculating 314 the average value of the measured signal strength values; estimating 316 the leakage signal to be the calculated average value; and removing 304, at the receiver part 220, the estimated leakage signal from the received uplink signal.

The received uplink signal comprises the actual signal from the transmitting mobile terminal, noise and the TX LO leakage signal. The leakage signal from the TX LO into the receiver can be estimated as a DC signal in the base band, whereas uplink signal and noise is fluctuating around 0 V. Consequently, by calculating an average value for an enough long time, the contribution to the average value from noise and uplink signal would be zero, whereas the contribution from the leakage signal would be the estimated DC level of the leakage signal. To estimate the leakage signal in the time domain as a DC signal is thereby a good estimation for the received uplink signal in the base band, especially if the same frequency is used for the TX LO as for the RX LO, which of course also includes the receiver being a homodyne receiver which uses the TX LO as its RX LO. Consequently, such an estimation is useful for removing the TX LO leakage signal from the received uplink signal.

When the uplink signal comprising the TX LO leakage signal is transformed from the time domain to the frequency domain, the signal will spread out over all subcarriers. The same is true for the TX LO leakage signal alone after a time to frequency transformation, at least if there is a frequency shift between the uplink central frequency and the downlink central frequency, as in the 3GPP standard TS 36.211.

Figure 5:
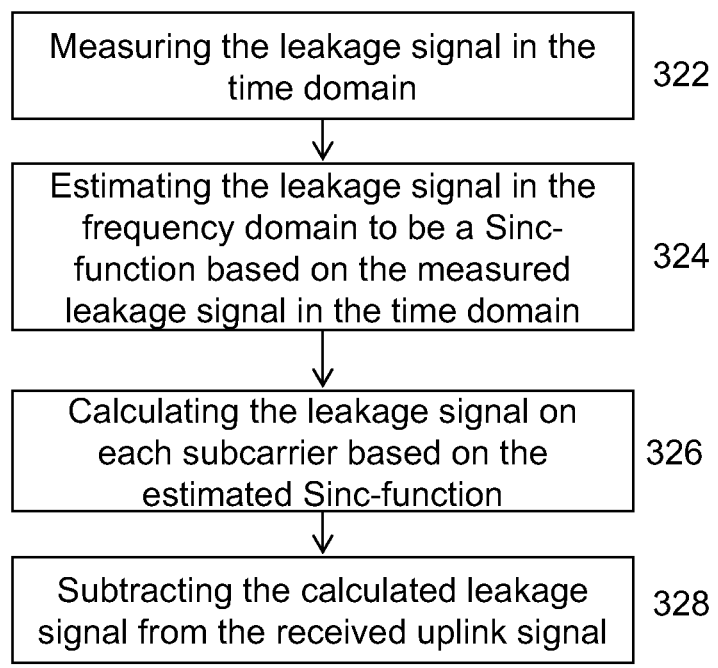

An exemplary method for controlling performance in a radio base station communicating in TDD mode, wherein the step of estimating and removing TX LO leakage signal is performed on signals in the frequency domain is described in FIG. 5. To perform an estimation in the frequency domain is advantageous since the interference in the frequency domain has low complexity. The exemplary method is described for a TDD system where there is a frequency shift between the uplink central frequency and the downlink central frequency, as for the TDD system described in the 3GPP standard TS 36.211. For TS 36.211 this frequency shift is 7.5 kHz. For such a system, the TX LO leakage signal will be a continuous wave having a frequency being the same as the frequency difference between the uplink central frequency and the downlink central frequency. This leakage signal will be spread to all uplink subcarriers in the frequency domain, i.e. after a time to frequency transformation of the received uplink signal, comprising the leakage signal.

This exemplary method is based on the idea that the TX LO leakage signal could be estimated as a sinc-function, sin x/x, where x is signal strength of the leakage signal over time or frequency, the sinc-function having peaks at the TX LO frequency and at a frequency defined as the TX LO frequency added with double the frequency difference between the uplink central frequency and the downlink central frequency, in case of TS 36.211, the TX LO frequency+15 kHz.

Consequently, the method of FIG. 5 comprises measuring 322 the signal strength in the receiver part for the leakage signal. This measurement may be performed in the time domain. The measurement may be performed on a received uplink signal, comprising the leakage signal. The method further comprises estimating 324 the leakage signal in the frequency domain to be a Sinc-function based on the measured signal strength. The sinc-function describes signal strength of the leakage signal over either time or frequency. To estimate the leakage signal to be a Sinc-function has proven to be a good estimation of the leakage signal, and, consequently, a good suppression of the leakage signal in the received uplink signal can be obtained. For a network where the frequency difference between the uplink central frequency and the downlink central frequency is half the distance between subcarriers, as for networks following TS 36.211, the leakage signal is preferably estimated as a Sinc-function having its largest values at subcarriers 0 and 1.

Further, signal strength values of the received uplink signal may be measured at a number of sampling points, and based on the measured signal strength values, an average value of the signal strength values can be calculated. The average value is then used as estimation for the leakage signal in time domain in estimating 324 the leakage signal in the frequency domain as a Sinc-function. This estimation may be used to remove the leakage signal from a received uplink signal, either in the time domain, or in the frequency domain. In FIG. 5 the method is described for leakage removal in the frequency domain according to the following: When the leakage signal has been estimated, the leakage signal is calculated 326 for each subcarrier based on the estimated Sinc-function. Further, the calculated leakage signal for each subcarrier is subtracted 328 from the received uplink signal. Since estimation of the leakage is an estimation of the signal strength (or amplitude) of the leakage signal, and removal of the leakage is made by subtracting the estimated signal strength from a received signal comprising the leakage signal, the steps of estimating and removing can be separate steps. Therefore, it is possible to perform the estimation step in the frequency domain and thereafter perform the removal (or subtraction) step in the time domain, or vice versa.

According to an exemplary embodiment, the estimating 302 of a leakage signal in the receiver part 220 is performed at a vacant uplink time slot or subframe. By "vacant uplink time slot or subframe" is meant a time slot or subframe configured to be used for sending signals from a mobile terminal to the radio base station, but which time slot or subframe is not used by any mobile terminal for sending any signals. If the estimation is performed at vacant uplink time slots or subframes, the estimation errors will be less, compared to estimating on a used uplink time slot when there are uplink signals received from mobile terminals.

According to another embodiment, the estimating 324 of the leakage signal in the frequency domain comprises: estimating the leakage signal in time domain based on the measured leakage signal, calculating the received uplink signal in frequency domain on subcarrier 0 and 1 based on the estimated leakage signal in time domain and calculating the leakage signal in frequency domain as a Sinc-function based on the estimated leakage signal in time domain and the calculated received uplink signal in frequency domain.

Figure 2:
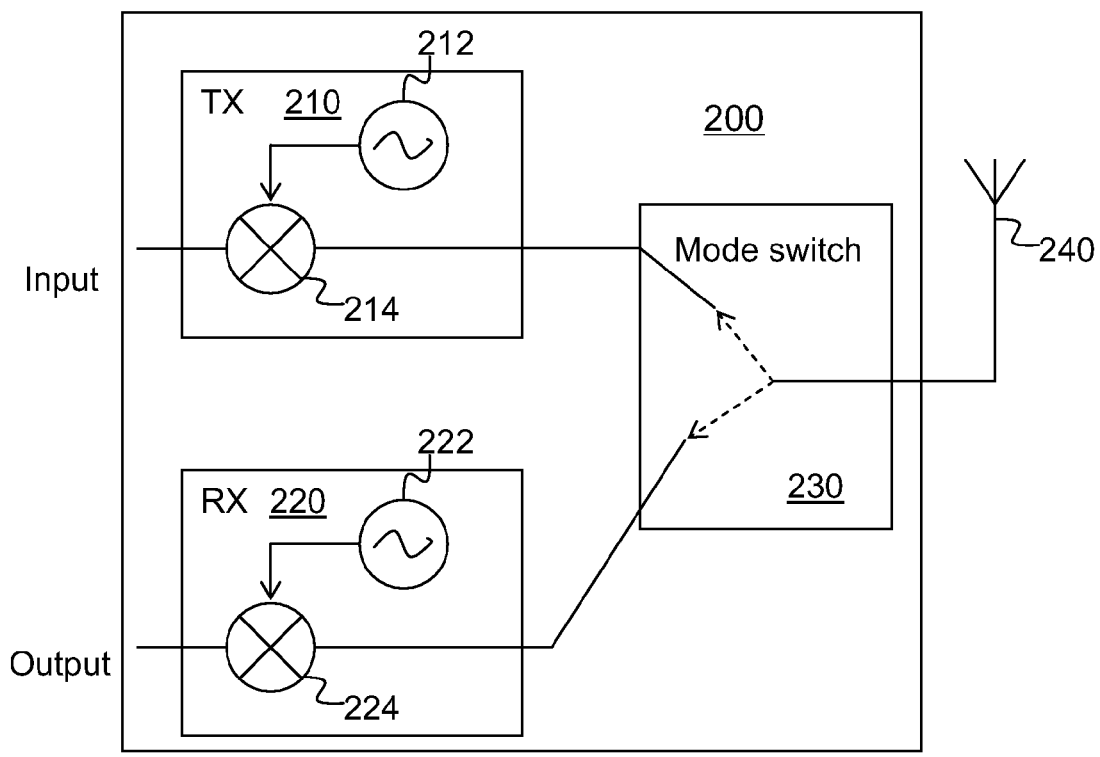
FIG. 2 is a schematic block diagram illustrating a typical transceiver of a radio base station for communication in TDD, according to prior art.
Figure 6:
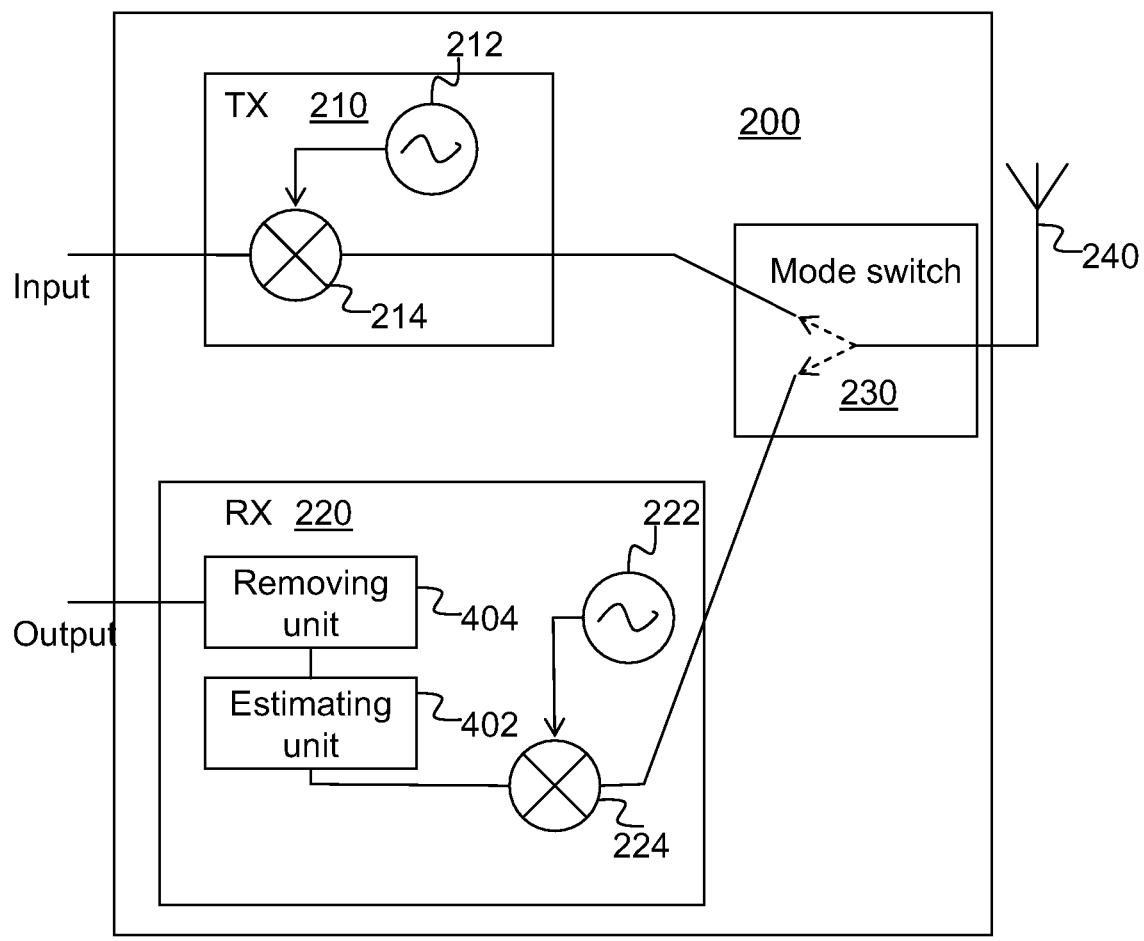
FIG. 6 is a schematic block diagram of a transceiver in a radio base station according to a possible embodiment.

FIG. 6 illustrates schematically a radio base station for communication in a TDD mode in a cellular network according to an embodiment. The base station differs from the prior art TDD base station of FIG. 2 in that it has in the receiver part 220: an estimation unit 402 for estimating a leakage signal originating from the TX LO 212, and a removing unit 404 for removing the estimated leakage signal from a received uplink signal. As could be seen in FIG. 6, the estimating unit 402 and the removing unit 404 are arranged at the base band side of the receiving unit, i.e. when a received uplink signal has been transformed from the RF frequency band into the base band, i.e. when the received uplink signal has passed the mixer 224.

According to an embodiment, the estimating unit 402 may further be arranged for measuring signal strength values of the received uplink signal at a number of sampling points, calculating the average value of the measured signal strength values, and estimating the leakage signal to be the calculated average value.

According to another embodiment of a radio base station, the estimating unit 402 is further arranged for measuring the leakage signal in the receiver part, and estimating the leakage signal in the frequency domain as a Sinc-function describing signal strength of the leakage signal over frequency, based on the measured leakage signal in the receiver part.

According to yet another embodiment of a radio base station, the estimating unit 402 is arranged for estimating the leakage signal in the frequency domain by estimating the leakage signal in time domain based on the measured leakage signal, calculating the received uplink signal in frequency domain on subcarrier 0 and 1 based on the estimated leakage signal in time domain, and calculating the leakage signal in frequency domain as a Sinc-function based on the estimated leakage signal in time domain and the calculated received uplink signal in frequency domain. By using such estimation, a good estimation in the frequency domain is achieved with a limited amount of calculations. To perform estimation in the frequency domain caters for lower computation complexity than in the time domain, and a time to frequency transformation is anyhow performed when processing a received signal. Consequently, a good estimation using a limited amount of processor power is achieved.

According to yet another embodiment of a radio base station, the removing unit 404 is arranged for calculating the leakage signal on each subcarrier based on the estimated Sinc-function, and subtracting the calculated leakage signal on each subcarrier from the received uplink signal.

Figure 7:
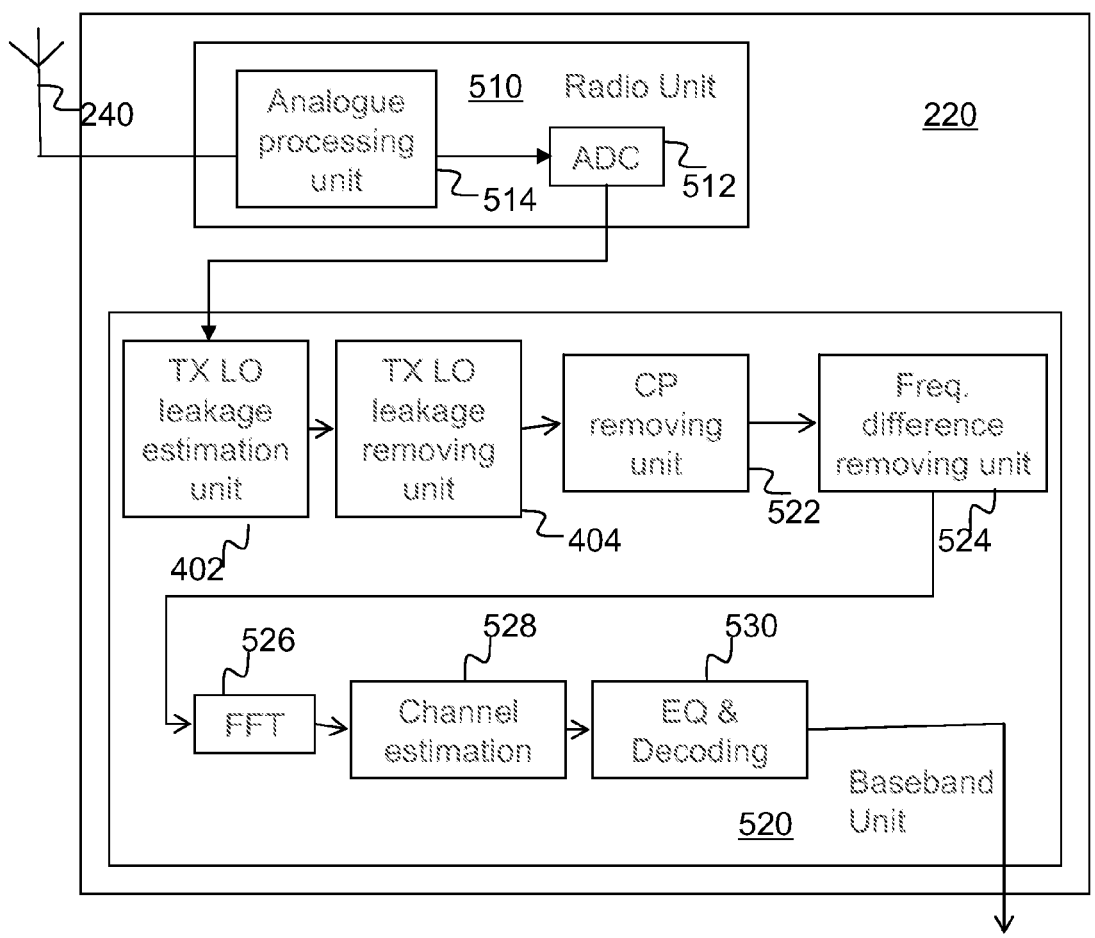
FIG. 7 is a schematic block diagram of a receiver part in more detail according to a possible embodiment.

In FIG. 7, a receiver part according to an embodiment in which TX LO leakage cancellation is performed in the time domain is described. The receiver part 220 comprises a radio unit 510, having an analogue processing unit 514 connected to the receiving antenna 240, for processing the received analogue radio signal, via a not shown mode switch 230. The receiver part further comprises an analogue to digital converter, ADC, 512 connected to the analogue processing unit 514, for converting the received analogue signal into digital format. Further, the radio unit 510 is connected to a baseband unit 520, such that the ADC is connected to a TX LO leakage estimating unit 402 for estimating TX LO leakage according to the method of the embodiments described. Before the digitally converted uplink signal is received at the baseband unit 520, it is down converted from the radio frequency range to the baseband, as performed by the RX mixer 224 in FIG. 2 and a not shown DDC (digital down converter).

After TX LO leakage has been estimated at estimating unit 402, the estimated TX LO leakage is removed from the uplink signal in the baseband in the TX LO leakage removing unit 404. Further, the thereby received signal experiencing low TX LO leakage is treated in a common way by removing cyclic prefix (CP) in the CP removing unit 522 and performing a Fast Fourier transformation in the FFT unit 526, the FFT unit being a time to frequency transformation unit for transforming the received uplink signal into the frequency domain. Further, the signal in the frequency domain is then commonly treated by performing channel estimation in the channel estimation unit 528, and equalization (EQ) and decoding in the EQ and decoding unit 530. If there is a frequency difference between the central frequency of the uplink signal and the central frequency of the downlink signal, the frequency difference is removed in an optional frequency difference removing unit 524, arranged between the CP removing unit 522 and the FFT 526.

In an example, which may use the arrangement of FIG. 7, the estimation of the leakage signal in the receiver part is performed in the time domain by assuming that the TX LO leakage signal is a Direct current signal, and by estimating a signal strength average value of the leakage signal. Then the estimation of the leakage signal in time domain $I_{i,t}$, where i means the $i_{th}$ sample, can be defined as $$I_{i,t} = \frac{1}{T_i} \int_0^{T_i} r_i(t) dt$$

where $r_i(t)$ is the received signal in the base band in the receiver part in the digital domain after ADC 512 and $T_i$ is the duration of a sample interval, which according to an embodiment is an uplink receiving interval, in this case the $i_{th}$ uplink receiving interval. Further, the digital signal from the radio unit 510 after ADC is $r=r_{m,i}=r_i(m\Delta t)$, where $\Delta t$ is the sampling interval, which should be selected appropriately. For example, for a 20 MHz LTE system a sampling rate of 30.72 MHz is selected, which results in a sampling interval of 32.552 ns. The estimation of the DC leakage level can then be estimated by averaging the received signal:

$$I_{i,d} = \frac{1}{M_i} \sum_{m=0}^{M_i-1} r_{m,i}$$

Where $M_i$ is the number of samples used to estimate the leakage in the $i_{th}$ uplink receiving interval. And $r_{m,i}$ is the $m_{th}$ received signal sample in the $i_{th}$ uplink receiving interval. Then the final estimation of the leakage interference is $I_t=\text{mean}(I_{i,t})$ in the analogue domain and in digital domain it will be $I_d=\text{mean}(I_{i,d})$. And then $I_d \approx I_t$.

When the TX LO leakage interference I has been estimated, it can be removed from the uplink received signal, in the TX LO leakage removing unit 404. The uplink signal after TX LO leakage has been removed will be $$\hat{r}_{m,i} = r_{m,i} - I_d$$

As mentioned, after TX LO leakage removal, the uplink signal is delivered to signal processing beginning with CP remove at CP removal unit 522 and FFT operations at FFT 526.

Figure 8:
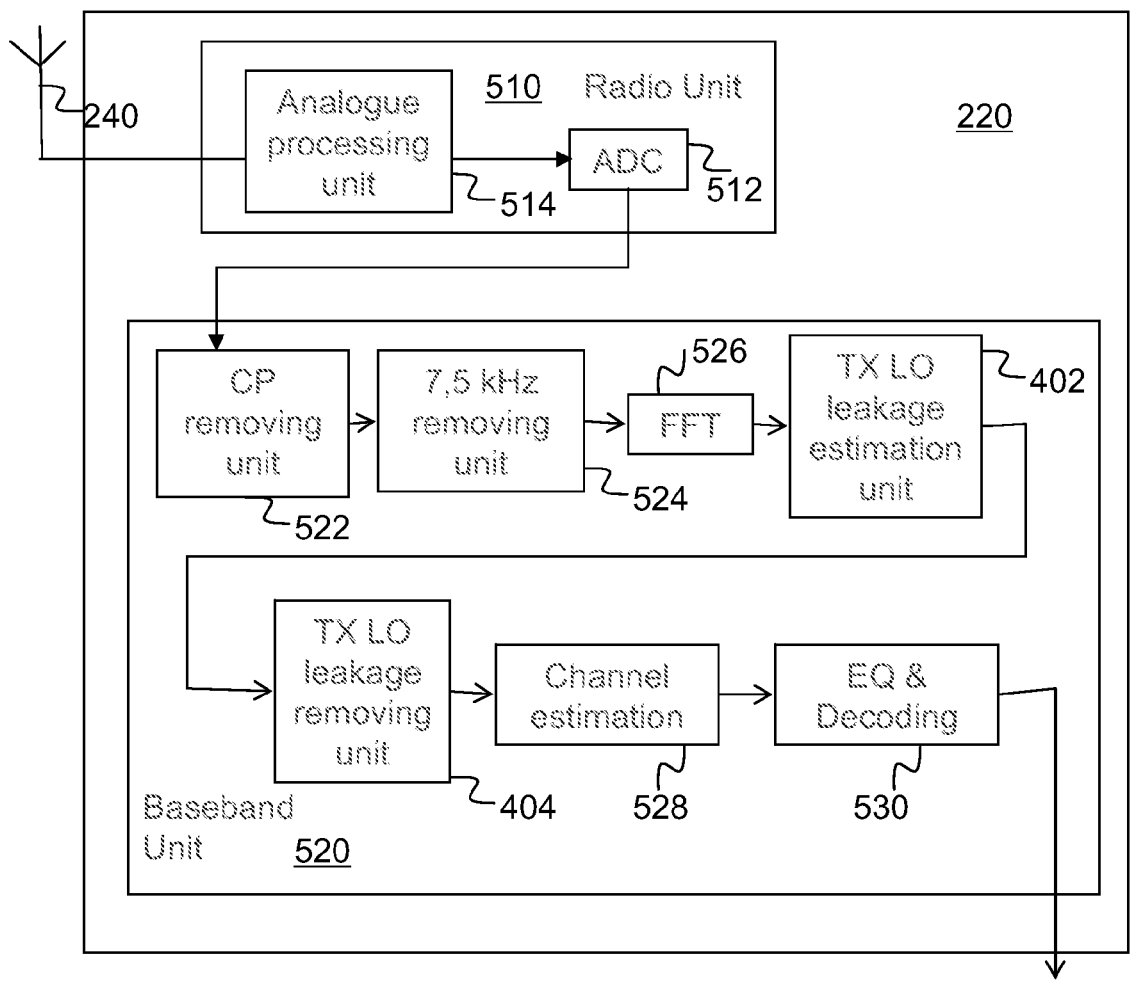
FIG. 8 is schematic block diagram of a receiver part in more detail according to another possible embodiment.

In FIG. 8, a receiver part according to an embodiment in which TX LO leakage removal is performed in the frequency domain is described. The receiver part of FIG. 8 comprises the same units as the receiver part of FIG. 7. In this case the TX LO leakage estimation and removing units 402, 404 are positioned after an uplink signal has been transformed into the frequency domain in the FFT 526.

When the received uplink signal, comprising the TX LO leakage signal, is transformed from the time domain to the frequency domain, the signal will spread out over all subcarriers. The same is true for the TX LO leakage signal alone after a time to frequency transformation, at least if there is a frequency shift between the uplink central frequency and the downlink central frequency, as in the 3GPP standard TS 36.211. Below this is explained for a frequency shift of 7500 Hz, as in TS 36.211. If the downlink signal central radio frequency is assumed to be x Hz, then the central frequency of the uplink radio signal will be x+7500 Hz. Then in the digital frequency domain the interference of the TX LO leakage to the receiver part is not orthogonal to the uplink sub-carriers because the sub-carrier width is 15 KHz. This will lead to interference to all or almost all the uplink sub-carriers. Therefore the TX LO leakage into the receiver part preferably has to be cancelled also for uplink subcarriers outside the TX LO frequency. For a frequency shift of 7500 Hz, the TX LO leakage signal interfering with the uplink signal will be a generally continuous wave of 7.5 KHz in the frequency domain, which, as described above, will have interference on all the uplink sub-carriers after the time to frequency transformation (FFT) in the baseband.

Figure 9:
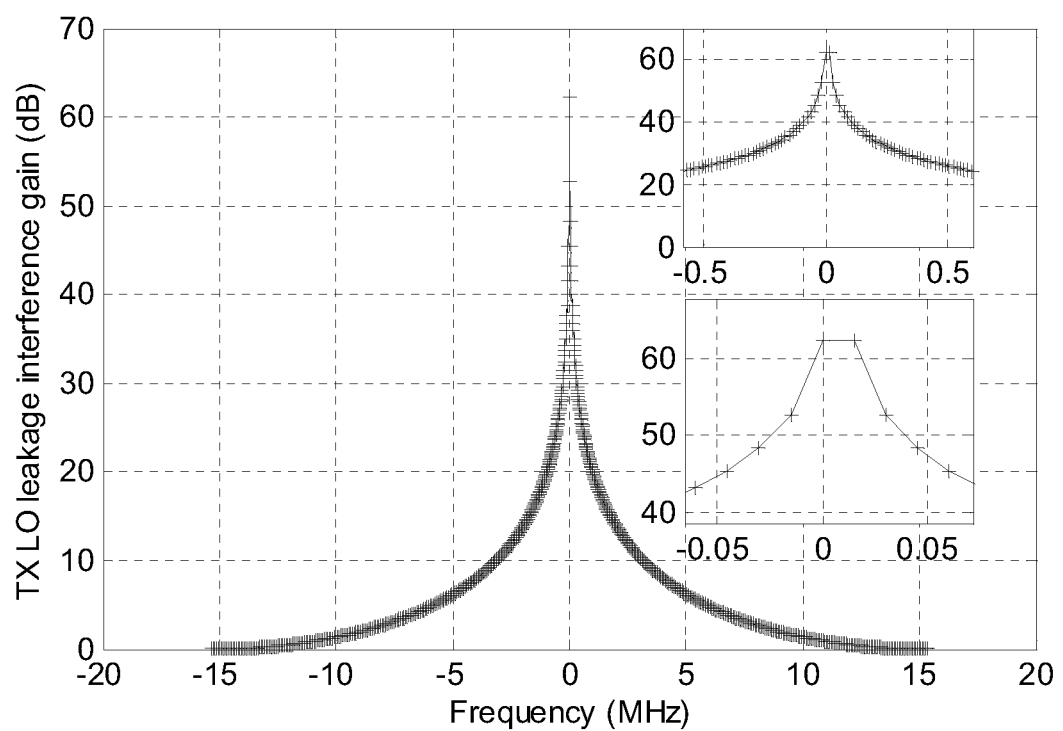
FIG. 9 is a diagram illustrating the TX LO leakage signal in the frequency domain.

According to an embodiment, the TX LO leakage signal in the frequency domain can be described as a Sinc-function, sin x/x, where x is the signal strength of the leakage signal described over time or frequency, the Sinc-function having peaks at the TX LO frequency (i.e. downlink frequency) and at a frequency which is the TX LO frequency+double the frequency difference between the downlink and uplink central frequency. In the example of a frequency difference between uplink central frequency and downlink central frequency of 7500 Hz, this means a peak at TX LO frequency and at TX LO frequency+15000 Hz. FIG. 9 shows the TX LO leakage signal strength in the frequency domain, in the base band, where the TX LO frequency has been subtracted, such that the signal strength is distributed around 0 MHz. As could be seen in the lower of the two smaller diagrams of FIG. 9, which is enlarged to show only a small frequency interval, there are two peaks.

Below, a calculation of TX LO leakage in the frequency domain is shown for the example where the frequency difference between the uplink central frequency and the downlink central frequency is 7.5 kHz. The example is however applicable for any frequency difference.

First, the signal is measured in the time domain as $s_{n,i}=I+r_n(i)$, Where I is the TX LO leakage interference in the time domain which is estimated as a DC-signal, $r_n(i)$ is the user signal, noise and the multi-user interference, received on the uplink on the $i_{th}$ sample of $n_{th}$ OFDM symbol, and $s_{n,i}$ is the $i_{th}$ sample of the $n_{th}$ OFDM symbol. Then the $i_{th}$ sample of the $n_{th}$ OFDM symbol in the frequency domain will be $$s_{n,i}'=E_n s_{n,i}\exp(ji\pi/N)$$

Where N is the number of FFT size, $E_n$ is the accumulated phase of the 7.5 KHz shift for the $n_{th}$ OFDM symbol in the uplink receiving interval, i.e. the sub-frame.

Then the signal $g_{n,0}$ on 0-th subcarrier and $g_{n,1}$ on 1-st sub-carrier in the frequency domain will be as follows $$g_{n,0} = \sum_{i=0}^{N-1} E_n s_{n,i}\exp(ji\pi/N)$$
$$= \sum_{i=0}^{N-1} E_n I\exp(ji\pi/N) + \sum_{i=0}^{N-1} E_n r_n(i)\exp(ji\pi/N)$$
$$= \sum_{i=0}^{N-1} E_n I\exp(ji\pi/N) + g_{n,0}'$$
$$= AE_n I + g_{n,0}'$$

$$g_{n,1} = \sum_{i=0}^{N-1} E_n s_{n,i}\exp(ji\pi/N)\exp(-j2\pi i/N)$$
$$= \sum_{i=0}^{N-1} E_n I\exp(ji\pi/N)\exp(-j2\pi i/N) +$$
$$\sum_{i=0}^{N-1} E_n r_n(i)\exp(ji\pi/N)\exp(-j2\pi i/N)$$
$$= \sum_{i=0}^{N-1} E_n I\exp(ji\pi/N)\exp(-j2\pi i/N) + g_{n,1}'$$
$$= (A)^* E_n I + g_{n,1}', \text{ where}$$

$$A = \sum_{i=0}^{N-1} \exp(ji\pi/N)\exp(-j2\pi i/N),$$

which results in that $$I = (g_{n,0} - g_{n,0}')E_n^*/A$$
$$= (g_{n,1} - g_{n,1}')E_n^*/A^*$$

Since it is assumed that the user signal, thermal noise and the multi-user interference has an average of 0 over different OFDM symbols, then the TX LO leakage interference onto the receiver part can be estimated as $$I' = \overline{\left((g_{n,0} - g_{n,0}')E_n^*/A + \overline{(g_{n,1} - g_{n,1}')E_n^*/A^*}\right)/2} =$$
$$(\overline{(g_{n,0})E_n^*/A} + \overline{(g_{n,1})E_n^*/A^*})/2$$

The averaging operation will give a more accurate result the more OFDM symbols that are used for the calculation.

After the leakage interference is estimated, then it can be removed in the time domain or in frequency domain as FIG. 7 and FIG. 8 shows. The leakage interference removal in the frequency domain can be performed as follows.

Since the TX LO leakage interference may be estimated as I' for all subcarriers, then the leakage interference in the frequency domain at each sub-carrier k (−N/2:1:N/2−1) will be $$I_k' = \sum_{i=0}^{N-1} E_n I'\exp(ji\pi/N)\exp(-j2\pi ik/N)$$
$$= \sum_{i=0}^{N-1} E_n I'\exp(-j2\pi i(k-1/2)/N)$$

Then the leakage interference on sub-carrier k can be removed by subtracting $I_k'$ from a received uplink signal.

The TX LO leakage estimation and removal can be performed either in the time domain or the frequency domain separately, or the estimation step can be performed in the time domain and the removal step in the frequency domain, or vice versa.

The methods described are useful for any TDD system.

While the solution has been described with reference to specific exemplary embodiments, the description is generally only intended to illustrate the inventive concept and should not be taken as limiting the scope of the solution. The solution is defined by the appended claims.

The invention claimed is:

1. A method for controlling performance in a radio base station communicating in a Time Division Duplex (TDD) mode in a cellular network, wherein the radio base station has a transceiver comprising a transmitter part, a receiver part, and an antenna, the antenna being alternately connectable to the transmitter part and the receiver part for the radio base station to alternately transmit and receive according to the TDD mode, the method comprising:
   transmitting, by the transmitter part, signals spread around a downlink central frequency; receiving, at the receiver part, signals spread around an uplink central frequency;
   estimating, at a baseband portion of the receiver part, a transmitter local oscillator (TX LO) leakage signal in the receiver part, the TX LO leakage signal originating from a local oscillator of the transmitter part, wherein the estimating comprises disregarding a received uplink signal which is represented as an AC component and retaining a DC component as an estimated leakage signal; and
   removing, at the baseband portion of the receiver part, the TX LO leakage signal by utilizing the estimated leakage signal as the TX LO leakage signal to recover the received uplink signal free of the TX LO leakage signal.

2. The method according to claim 1, wherein estimating the TX LO leakage signal and removing the TX LO leakage signal are performed at the baseband portion of the receiver part, on the received uplink signal, when the received uplink signal is in a base band.

3. The method according to claim 1, wherein estimating the TX LO leakage signal is performed by measuring signal strength in the receiver part for the received uplink signal to obtain the DC component.

4. The method according to claim 1, wherein estimating the TX LO leakage signal comprises:
   measuring signal strength values of the received uplink signal at a number of sampling points;
   calculating an average value of the measured signal strength values as the DC component; and
   estimating the TX LO leakage signal to be the calculated average value.

5. The method according to claim 1, wherein estimating the TX LO leakage signal is performed by:
   measuring the DC component in the receiver part, and
   estimating the TX LO leakage signal in a frequency domain as a Sinc-function based on the DC component in the receiver part.

6. The method according to claim 5, wherein measuring the DC component in the receiver part comprises:
   measuring signal strength values of the received uplink signal at a number of sampling points;
   calculating an average value of the measured signal strength values as the DC component; and
   estimating the TX LO leakage signal in a time domain to be the calculated average value.

7. The method according to claim 5, wherein the Sinc-function, when applied to the estimated leakage signal, has its largest values at subcarriers 0 and 1.

8. The method according to claim 5, wherein estimating the TX LO leakage signal in the frequency domain comprises:
   estimating the TX LO leakage signal in a time domain based on the measured DC component; and
   calculating the TX LO leakage signal in the frequency domain as a Sinc-function on subcarriers 0 and 1 based on the estimated leakage signal obtained in the time domain and baseband processing of the received uplink signal in the frequency domain.

9. The method according to claim 5, wherein removing the TX LO leakage signal is performed by:
   calculating the estimated leakage signal on each subcarrier based on the Sinc-function, and
   subtracting the calculated estimated leakage signal on each subcarrier from the received uplink signal.

10. The method according to claim 1, wherein estimating the TX LO leakage signal in the receiver part is performed at one or more of a vacant uplink time slot and subframe.

11. The method according to claim 1,
   wherein a difference between the uplink central frequency and the downlink central frequency is half of the frequency difference between subcarrier frequencies in the cellular network.

12. A radio base station for communication in a Time Division Duplex (TDD) mode in a cellular network, the radio base station comprising:
   a transceiver comprising a transmitter part, a receiver part, and an antenna, wherein the transmitter part transmits signals spread around a downlink central frequency and wherein the receiver part receives signals spread around an uplink central frequency;
   wherein the antenna is alternately connectable to the transmitter part and the receiver part for the radio base station to alternately transmit and receive according to the TDD mode;
   wherein the transmitter part comprises a transmitter local oscillator (TX LO); and
   a baseband unit having a processor, to operate at the receiver part, and a non-transitory computer readable storage medium, the non-transitory computer readable storage medium storing instructions, which when executed by the processor causes the baseband unit to:
      estimate a TX LO leakage signal in the receiver part, wherein the TX LO leakage signal originates from the transmitter local oscillator, wherein the estimate comprises disregarding a received uplink signal which is represented as an AC component and retaining a DC component as an estimated leakage signal; and
      remove the TX LO estimated leakage signal by utilizing the estimated leakage signal as the TX LO leakage signal to recover the received uplink signal free of the TX LO leakage signal.

13. A radio base station according to claim 12, wherein the instructions, when executed by the processor, further causes the baseband unit to:
   measure signal strength values of the received uplink signal at a number of sampling points,
   calculate an average value of the measured signal strength values as the DC component, and
   estimate the TX LO leakage signal to be the calculated average value.

14. A radio base station according to claim 12, wherein the instructions, when executed by the processor, further causes the baseband unit to:

measure the DC component in the receiver part, and estimate the TX LO leakage signal in a frequency domain as a Sinc-function based on the DC component in the receiver part.

15. A radio base station according to claim 14, wherein the instructions, when executed by the processor, further causes the baseband unit to:

estimate the TX LO leakage signal in a time domain based on the measured DC component, and calculate the TX LO leakage signal in the frequency domain as a Sinc-function on subcarriers 0 and 1 based on the estimated leakage signal obtained in the time domain and baseband process the received uplink signal in the frequency domain.

16. A radio base station according to claim 14, wherein the instructions, when executed by the processor, further causes the baseband unit to:

calculate the estimated leakage signal on each subcarrier based on the Sinc-function, and subtract the calculated estimated leakage signal on each subcarrier from the received uplink signal.

17. A radio base station according to claim 12, wherein the instructions, when executed by the processor, further causes the baseband unit to estimate a leakage signal in the receiver part at one or more of a vacant uplink time slot and subframe.

18. A non-transitory computer-readable storage medium storing instructions, the instructions that when executed by one or more processors of a radio base station comprising a receiver part and a transmitter part communicating in a Time Division Duplex (TDD) mode where the receiver part and the transmitter part alternately transmit and receive according to the TDD mode, cause the one or more processors to perform operations that:

transmit, by the transmitter part, signals spread around a downlink central frequency; receive, at the receiver part, signals spread around an uplink central frequency;

estimate, at a baseband portion of the receiver part, a transmitter local oscillator (TX LO) leakage signal in the receiver part, the TX LO leakage signal that originates from a local oscillator of the transmitter part, wherein the estimate comprises disregarding a received uplink signal which is represented as an AC component and retaining a DC component as an estimated leakage signal; and remove, at the baseband portion of the receiver part, the TX LO leakage signal by utilizing the estimated leakage signal as the TX LO leakage signal to recover the received uplink signal free of the TX LO leakage signal.

19. The non-transitory computer-readable storage medium according to claim 18, wherein the operations that estimate the TX LO leakage signal and remove the TX LO leakage signal are performed at the baseband portion of the receiver part, on the received uplink signal, when the received uplink signal is in a base band.

20. The non-transitory computer-readable storage medium according to claim 18, wherein the operations that estimate the TX LO leakage signal includes measuring signal strength in the receiver part for the received uplink signal to obtain the DC component.

* * * * *